US008892936B2

(12) United States Patent
Katkar et al.

(10) Patent No.: US 8,892,936 B2
(45) Date of Patent: Nov. 18, 2014

(54) CLUSTER WIDE CONSISTENT DETECTION OF INTERCONNECT FAILURES

(75) Inventors: Amol Katkar, Maharashtra (IN); Om Prakash Agarwal, Maharashtra (IN); Bhavin Thaker, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 220 days.

(21) Appl. No.: 13/425,127

(22) Filed: Mar. 20, 2012

(65) Prior Publication Data

US 2013/0254599 A1 Sep. 26, 2013

(51) Int. Cl.
*G06F 11/00* (2006.01)
(52) U.S. Cl.
USPC .............................. 714/4.1; 714/57
(58) Field of Classification Search
CPC ................................................... G06F 11/202
USPC ............... 714/57, 4.1, 4.11, 748–750
See application file for complete search history.

(56) References Cited

U.S. PATENT DOCUMENTS

| 6,101,180 | A | 8/2000 | Donahue et al. | |
|---|---|---|---|---|
| 7,134,046 | B2 * | 11/2006 | Rathunde et al. | 714/10 |
| 2003/0058804 | A1 | 3/2003 | Saleh et al. | |
| 2003/0177218 | A1 | 9/2003 | Poirot et al. | |
| 2004/0001449 | A1 * | 1/2004 | Rostron et al. | 370/282 |
| 2004/0205414 | A1 * | 10/2004 | Roselli et al. | 714/39 |
| 2005/0083834 | A1 * | 4/2005 | Dunagan et al. | 370/221 |
| 2009/0138752 | A1 * | 5/2009 | Graham et al. | 714/4 |
| 2011/0219263 | A1 | 9/2011 | Goel | |

FOREIGN PATENT DOCUMENTS

WO WO 2004/107196 A1 12/2004

OTHER PUBLICATIONS

PCT International Search Report and Written Opinion for Counterpart Application PCT/US13/28346 dated Jun. 5, 2013, 6 pages.

\* cited by examiner

*Primary Examiner* — Dieu-Minh Le
(74) *Attorney, Agent, or Firm* — Brill Law Office; Jeffrey Brill

(57) ABSTRACT

The failure of a specific link of a specific node of a cluster is detected, for example through the operating system of the specific node. A notification of the failure of the specific link is disseminated to the nodes of the cluster, such that the nodes receive the notification prior to learning of the link-down event from the expiration of corresponding heartbeats, and process the event in parallel. The notification of the link failure can be disseminated by broadcasting a message notifying the nodes of the failure of the specific link. The notification of the link failure can also be disseminated by transmitting the notification to a centralized computing device which is polled by the nodes of the cluster at a specific frequency for notifications of link failures.

20 Claims, 6 Drawing Sheets

CLUSTER WIDE CONSISTENT DETECTION OF INTERCONNECT FAILURES

TECHNICAL FIELD

This disclosure pertains generally to the management of computer clusters, and more specifically to consistent, cluster wide detection of link failures.

BACKGROUND

High-availability clusters (also known as HA clusters or failover clusters) are groups of computers (nodes) that support running server applications with a minimum of downtime. A high-availability cluster uses groups of redundant computing resources in order to provide continued service when individual system components fail. More specifically, high-availability clusters eliminate single points of failure by providing multiple servers, multiple network connections, redundant data storage, etc. Absent clustering, if a server running a particular application fails, the application would be unavailable until the server is restored. In high-availability clustering, the failure of a server (or of a specific computing resource used thereby such as a network adapter, storage device, etc.) is detected. Steps are automatically taken to allow the application that was being run on the failed server to remain available. This can be in the form of restarting the server and application, using a different network resource (e.g., network adapter), or automatically restarting the application on another computing system (i.e., another node of the cluster). This process is called "failover." High-availability clusters are often used for critical server applications such as enterprise databases, important business applications, electronic commerce websites, etc. Even a short period of downtime for such applications can be extremely expensive, especially in certain industries such as banking and telecommunications.

In computer storage, logical volume management is a flexible method of allocating space on mass-storage devices. In particular, a volume manager can concatenate, stripe together or otherwise combine underlying physical partitions into larger, virtual ones. An administrator can then re-size or move logical volumes, potentially without interrupting system use. A cluster volume manager extends volume logical management across the multiple nodes of a cluster, such that each node recognizes the same logical volume layout, and the same state of all volume resources of all nodes. Under cluster volume management, any changes made to disk or volume configuration from any node in the cluster are recognized by all the nodes of the cluster. In order to support cluster level volume management, the cluster is reconfigured when new nodes join the cluster, and when existing nodes leave the cluster.

A cluster uses interconnections (links) between the nodes for data and administrative communication. Corrective actions need to be taken if a link fails. The efficiency and timeliness of recovering from failovers and other cluster activity depends on the speed with which the cluster is able to detect and process the link failure. An individual node can use operating system services to detect whether any of its links have failed. Where two nodes are connected directly (using crossover cable) without any switches, the link-down notification is received by both of the nodes such that they can react to this event in parallel. However, where more than two nodes are coupled using switches, only the local node learns of the link failure in real time. Thus, because of the network topologies in a cluster, typically only a single node or a localized subset of nodes learns of a link failure immediately. Conventionally, the other nodes subsequently learn of the connection failure through a cluster wide heartbeat mechanism used to monitor the status of each node in the cluster. The heartbeat mechanism is relatively slow compared to the time it takes an individual node to learn of a local link failure. The proper management of a cluster can depend on each node of the cluster being aware of the link failure before taking corrective action. The interval of time until each node learns of the failure through the heartbeat mechanism delays any cluster reconfiguration or failover activity necessitated by the downed connection, and causes additional problems with the management of the cluster, such as with the execution of fencing arbitration decisions. Furthermore, incorrect or undesirable recovery activity can occur where the nodes of the cluster learn of a link failure at different times.

It would be desirable to address these issues.

SUMMARY

Notifications of link failures are propagated to each of a plurality of nodes in a cluster. The failure of a specific link of a specific node of the cluster is detected, for example through the operating system of the specific node. A notification of the failure of the specific link is disseminated to the plurality of nodes of the cluster, such that the nodes process the link-down event in parallel. The dissemination of the notification of the link failure is executed such that the nodes of the cluster receive the notification prior to learning of the link-down event from the expiration of corresponding heartbeats. In some embodiments, the notification of the failure of the link is only disseminated after waiting for a specific grace period, in case the link comes back up right away.

In one embodiment, the notification of the link failure is disseminated by broadcasting a message notifying the nodes of the cluster of the failure of the specific link. A separate link is maintained, which is connected to each node of the cluster and dedicated to broadcasting link-down event notification messages. This separate link can be used to broadcast the message to the nodes of the cluster. The separate link can but need not be in the form of a private link, which is not exposed to users of the cluster. In one embodiment, it is ensured that the broadcast message has been received by the nodes of the cluster before processing the link-down event. This can be done, for example, by waiting to receive an acknowledgement confirming receipt of the broadcast message from each of the nodes of the cluster. In one embodiment, if an acknowledgement confirming receipt of the broadcast message is not received from each of the nodes within a given period of time, the broadcast message is retransmitted.

In another embodiment, the notification of the link failure is disseminated to the nodes of the cluster by transmitting the notification to a centralized computing device that is accessible to all of the nodes. The nodes of the cluster can poll the centralized computing device at a specific frequency for notifications of link failures, and learn of the failure of the specific link from the polling. In one embodiment, instead of (or in addition to) the polling, the centralized computing device transmits the notification of the failure of the specific link to the nodes of the cluster.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
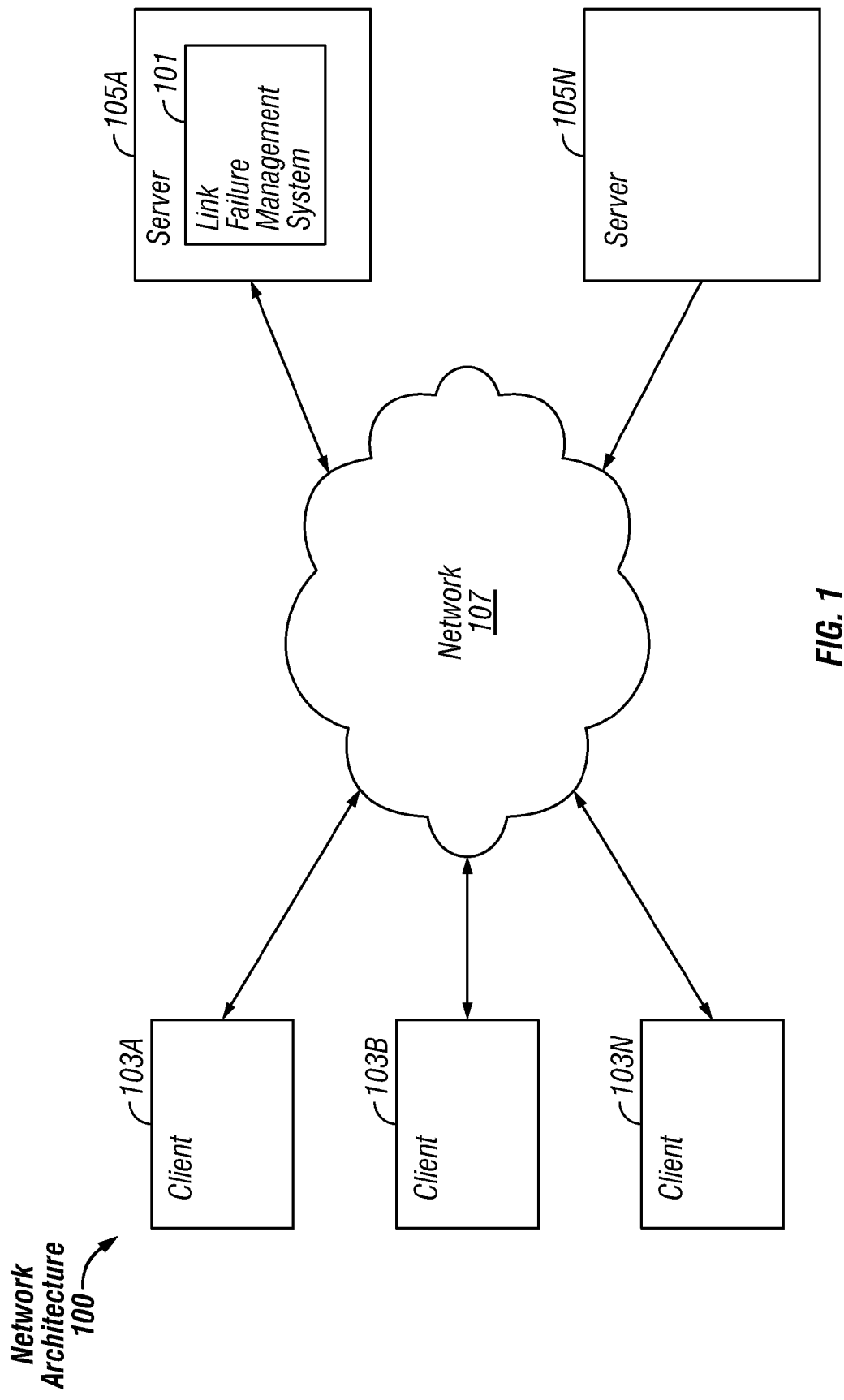
FIG. 1 is a block diagram of an exemplary network architecture in which a link failure management system can be implemented, according to some embodiments.

FIG. 1 is a block diagram illustrating an exemplary network architecture 100 in which a link failure management system 101 can be implemented. The illustrated network architecture 100 comprises multiple clients 103A, 103B and 103N, as well as multiple servers 105A and 105N. In FIG. 1, the link failure management system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
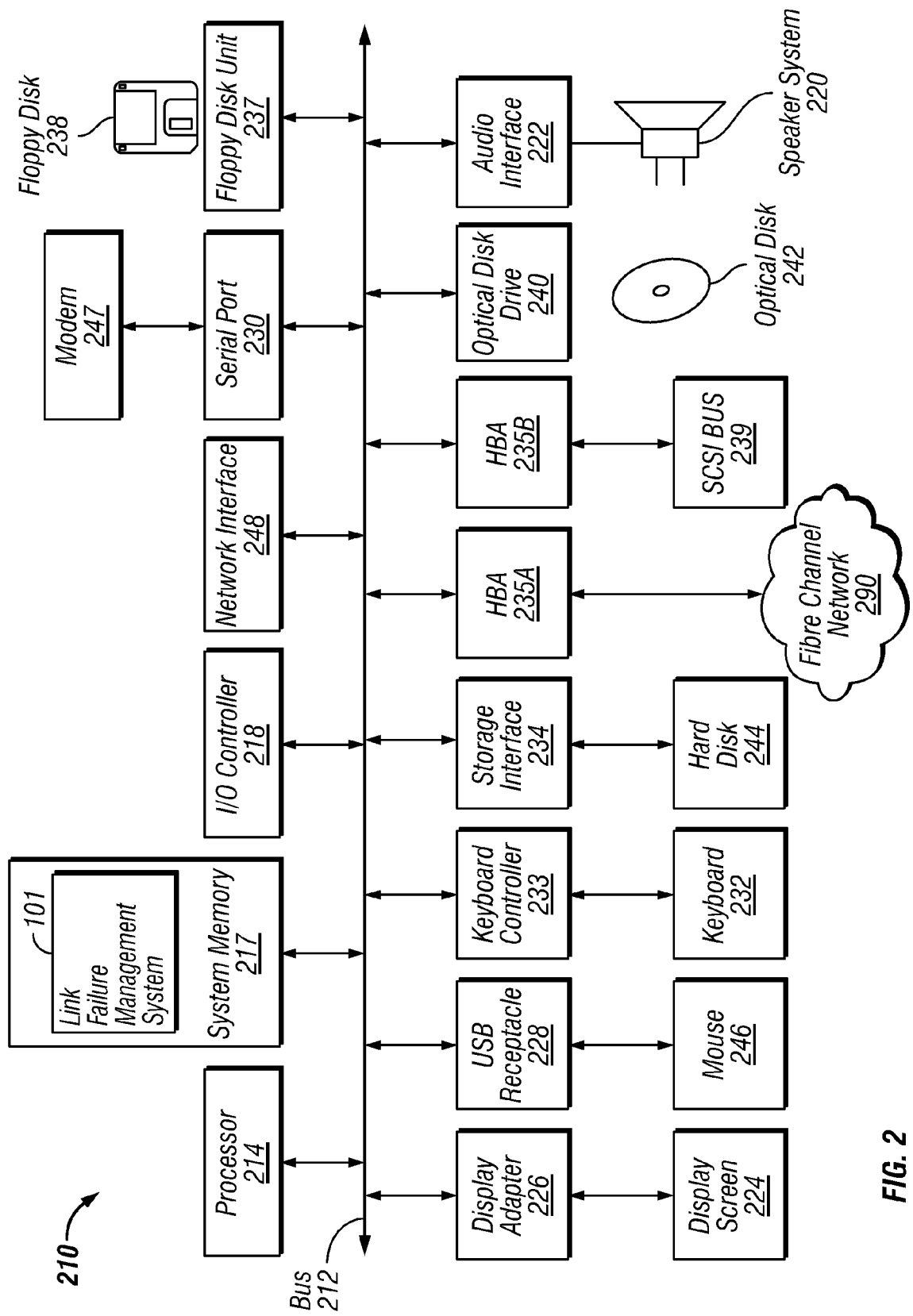
FIG. 2 is a block diagram of a computer system suitable for implementing a link failure management system, according to some embodiments.

FIG. 2 is a block diagram of a computer system 210 suitable for implementing a link failure management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the link failure management system 101 is illustrated as residing in system memory 217. The workings of the link failure management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
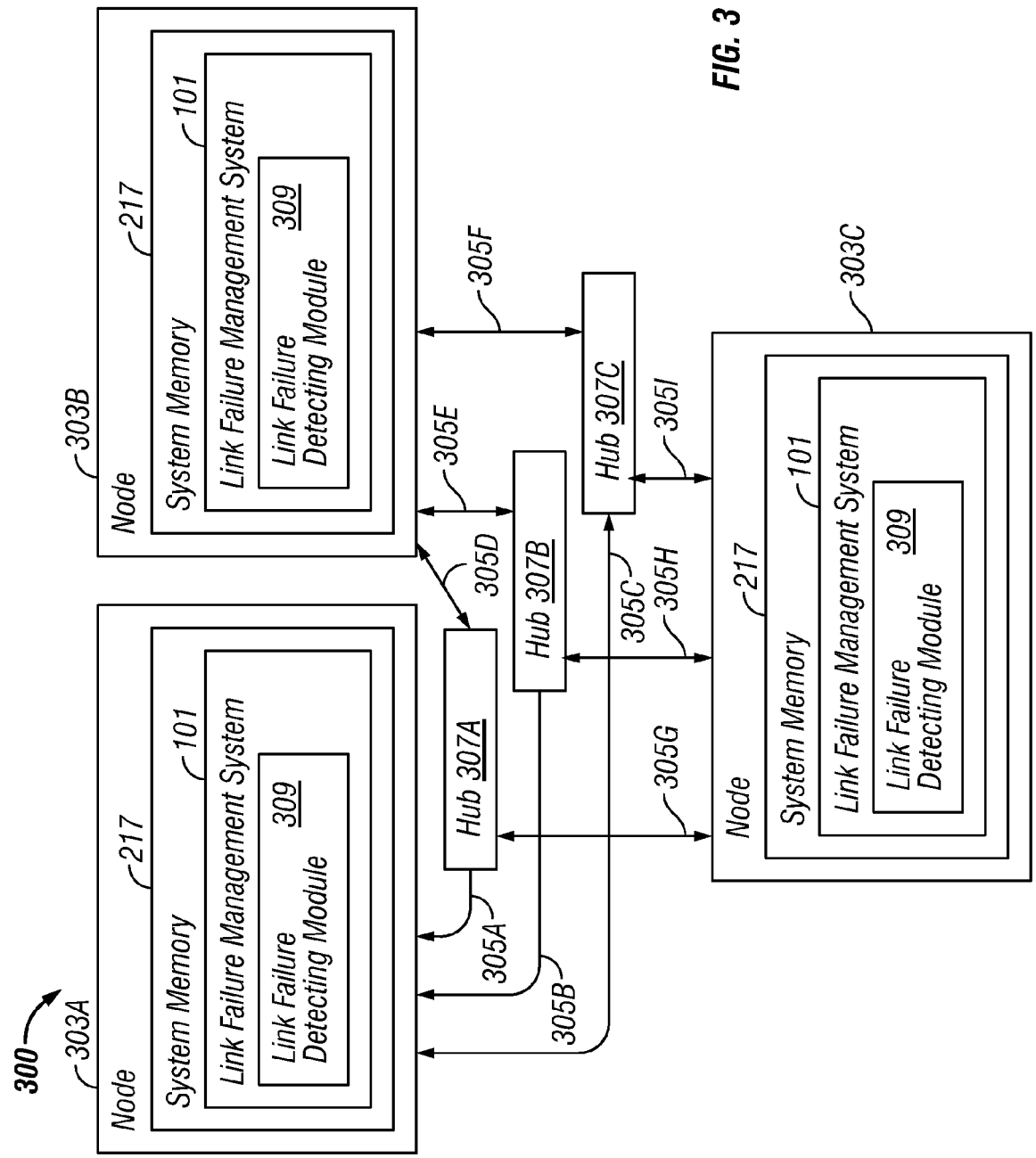
FIG. 3 is a block diagram of a link failure management system detecting the failure of a link in an example cluster topography, according to some embodiments.
Figure 4:
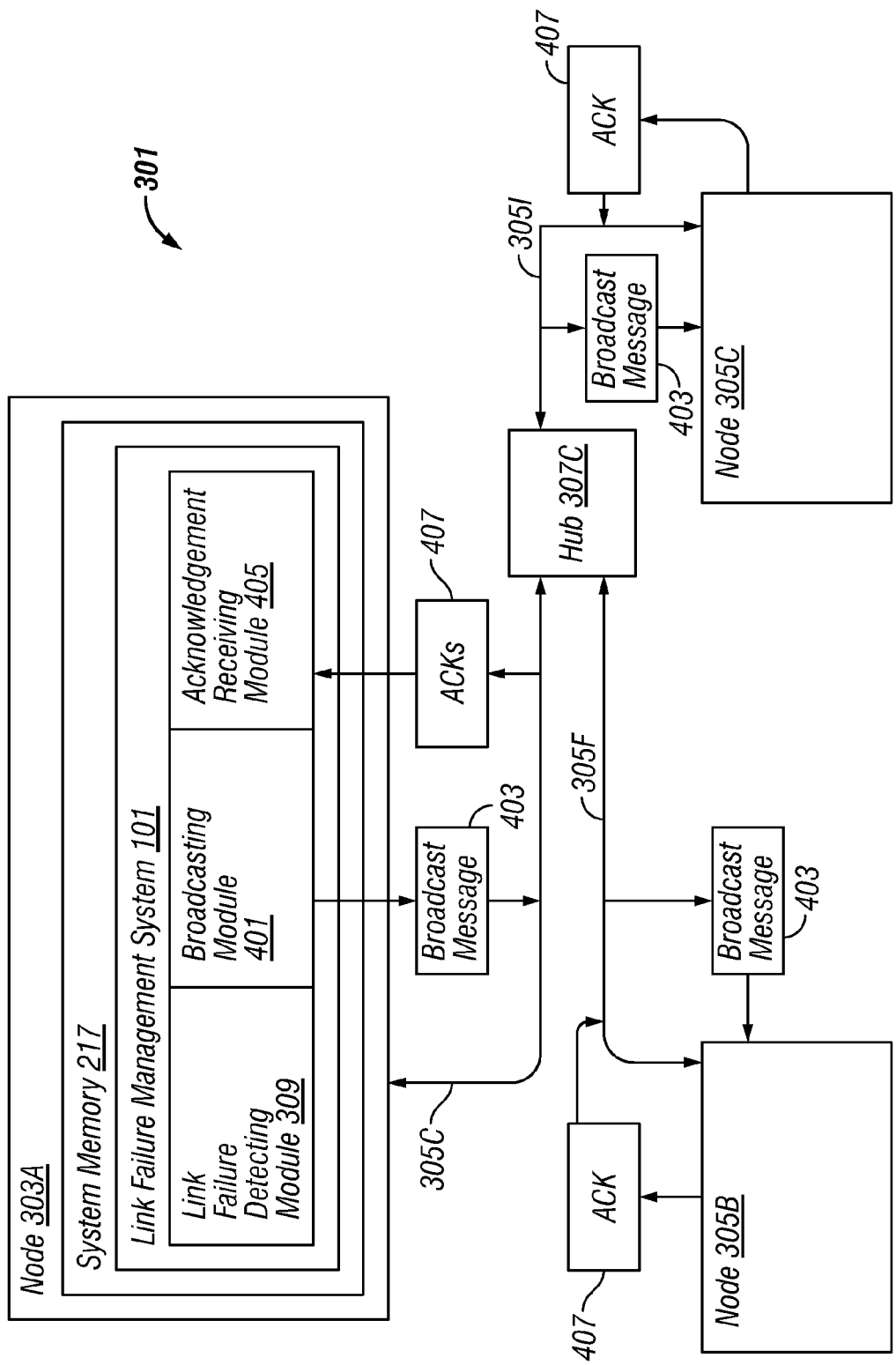
FIG. 4 is a block diagram of a link failure management system disseminating a notification of a link failure to nodes of a cluster through a broadcast message, according to some embodiments.

FIG. 3 illustrates a link failure management system 101 detecting the failure of a link 305 in an example cluster 301 topography, according to some embodiments. As described above, the functionalities of the link failure management system 101 can reside on a client 103, a server 105, or be distributed between multiple computer systems 210, including within a cloud-based computing environment in which the functionality of the link failure management system 101 is provided as a service over a network 107. It is to be understood that although the link failure management system 101 is illustrated in FIG. 3 as a single entity, the illustrated link failure management system 101 represents a collection of functionalities, which can be instantiated as a single or multiple modules as desired (an instantiation of specific, multiple modules of the link failure management system 101 is illustrated in FIGS. 3 and 4). For illustration purposes, a link failure management system 101 is depicted as residing on each node 303 of the illustrated cluster 301 and managing functionality that occurs on that node 303. In practice, the link failure management system 101 can be centralized or otherwise distributed across multiple nodes 303 of the cluster 301 as desired.

It is to be understood that the modules of the link failure management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the link failure management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the link failure management system 101 enables fast, cluster 301 wide propagation of the detection of failed links 305. For clarity, FIG. 3 illustrates a cluster 301 comprising three nodes: nodes 303A, 303B, and 303C. It is to be understood that in the field, clusters 301 would typically contain orders of magnitude more nodes 303. The nodes 303 are connected using network links 305 and hubs 307. In the example illustrated in FIG. 3, each node 303 is connected by a separate link 305 to three different hubs: hub 307A, 307B, and 307C. In different embodiments more or fewer links 305 and hubs 307 can be deployed to create a network topology connecting the nodes 303 of the cluster 301.

As illustrated in FIG. 3, a link failure detecting module 309 of the link failure management system 101 on node 303A detects when any of node 303A's links 305 (i.e., link 305A-C) fail. (A similar module on each of the other nodes 303 detects failures of their local links 305). The link failure detecting module 309 can use operating system services on its local node 303 to receive immediate notification when a local link 305 goes down. For example, if link 305A were to break, the link failure detecting module 309 on node 303A would receive an immediate notification from the operating system (not illustrated) on node 303A. However, nodes 303B 303C would be unaware of this link-down event, because the link failure detecting module 309 only detects failure of the links 305 of its local node 303. This is the case because the operating system on a given node, e.g., 303A, only detects link 305 failures local to that node 303.

Conventionally, the other nodes 303 in the cluster 301 would learn of the failure of node 303A's link by monitoring heartbeats. However, as noted above, relying on heartbeats necessitates an overly long delay before remote nodes 303 can conclude that a remote link 305 has failed. In the illustrated example, although node 303A would learn of the failure of link 305A immediately, nodes 303B and 303C would have to wait for the corresponding heartbeats to expire before being able to conclude that link 305A had failed. As explained above, this is problematic both because it is important for the management of the cluster 301 that each node 303 process the link-down event (i.e., respond to the link 305 being down) in parallel, and it is desirable that this by done more quickly than can be facilitated by relying on the heartbeat mechanism.

Figure 5:
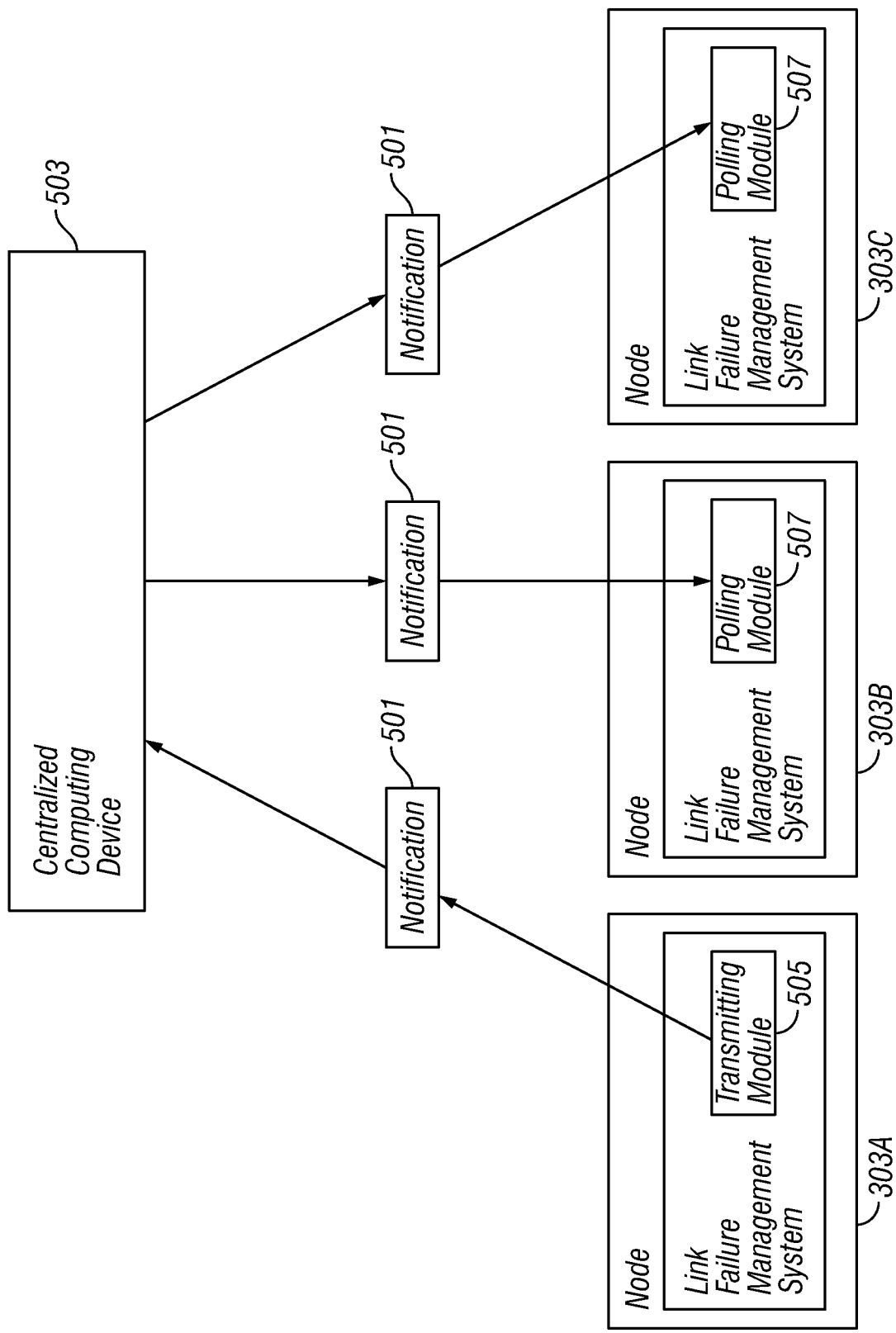
FIG. 5 is a block diagram of a link failure management system disseminating a notification of a link failure to nodes of a cluster through a centralized computing device, according to some embodiments.

As illustrated in FIGS. 4-5, the link failure management system 101 on the local node 303 disseminates a notification of the failure of the link 305 to the other nodes 303 of the cluster 301, such that the nodes 303 of the cluster 301 can process the link-down event in parallel. As described in more detail below, in different embodiments the link failure management system 101 uses different methods to execute the dissemination of the notification of the failure of the link 305 to the nodes 303 of the cluster 301. It is to be understood that in these different embodiments, the dissemination of the notification of the link 305 failure is executed such that the nodes 303 of the cluster 301 receive the notification prior to the expiration of the corresponding heartbeats. Thus, the link failure management system 101 enables the nodes 303 of the cluster 301 to process the link-down event in parallel, more quickly than could be achieved by relying on the heartbeat mechanism.

FIG. 4 illustrates an embodiment in which the link failure management system 101 disseminates information concerning the failure of a link 305 to nodes 303 of the cluster 301 through a broadcast message 403. In one embodiment, in response to learning of the failure of a local link (e.g., link 305A in the example topology illustrated in FIG. 3), a broadcasting module 401 of the link failure management system 101 on the local node (e.g., node 303A) generates and sends a broadcast message 403 notifying the nodes 303 of the cluster 301 of the detected link 305 failure. Thus, all of the other nodes 303 in the cluster 301 receive notification of the link 305 failure at the same time, and can thus process this event in parallel. In different embodiments, different links 305 can be used to transmit the broadcast message 403, depending upon which links 305 are available for this purpose.

For example, in one embodiment, some links 305 within the cluster 301 are configured as standard cluster links 305 (e.g., in the example topology illustrated in FIG. 3 links 305A, 305D, and 305G interconnecting through hub 307A, and links 305B, 305E, and 305H interconnecting through hub 307B), whereas a set of links 305 is reserved for link-down event broadcast messages 403 (e.g., links 305C, 305F and 305I interconnecting through hub 307C). In this scenario, if the link failure detecting module 309 on node 303A detects that link 305A and/or link 305B has gone down, it could use dedicated link 305C to transmit the broadcast message 403 to nodes 303B and 303C. In one embodiment, the separate links 305 dedicated for failure detection broadcast messages 403 are private to the link failure management system 101, and are not exposed to the users of the cluster 301. In this scenario, a dedicated link 305 is connected to all the nodes 303 in the cluster 301, and is used only to send link-down event information. This ensures a dedicated channel for the communication of broadcast messages 403 indicating the detection of a link 305 failure.

In another embodiment, these links 305 are private to the link failure management system 101, but can be used for traffic other than link-down event information. In yet another embodiment, the links 305 used to transmit link-down event information are not private to the link failure management system 101, and can be used for other traffic by other parties, for example on a bandwidth available basis. In some embodiments, a dedicated link 305 for communicating link-down event information is not available, in which case other links 305 can be used for this purpose (e.g., existing public links 305, including high priority links 305 or low priority links, e.g., one if the other is down, etc.). It is to be understood that in different embodiments, whatever links 305 are available can be used to transmit link-down event information as desired.

Once the link-down event message 403 has been broadcast, the link failure management system 101 on the local node (e.g., 303A in FIG. 3) takes steps to ensure that the broadcast message 403 has been received by the other nodes 303 in the cluster 301 before processing the link-down event. This ensures that the multiple nodes 303 of the cluster 301 process the link-down event simultaneously. In one embodiment, an acknowledgement receiving module 405 of the link failure management system 101 waits to receive acknowledgements (ACKs) 407 confirming receipt of the broadcast message 403 from each of the other nodes 303 in the cluster 301. Receiving an ACK 407 from each of the other nodes 303 indicates that every node 303 in the cluster is aware of the link 305 failure. If the broadcast message 403 itself, or an ACK 407 from one or more nodes 303, is dropped by the network, the acknowledgement receiving module 405 does not receive an ACK 407 from every other node 303 in the cluster 301. In one embodiment, in response to not having received an ACK 407 from each node 303 in the cluster 301 within a given period of time, the broadcasting module 401 retransmits the broadcast message 403. In some instances, the broadcast message 403 can be retransmitted multiple times, responsive to not receiving one or more expected ACKs 407. It is to be understood that the length of time to wait before retransmission, as well as the number of times to retransmit, are design parameters which can vary between embodiments. In any case, these parameters are typically set such that the total amount of time the acknowledgement receiving module 405 waits for ACKs 407 is still less than the scale of time used by the heartbeat mechanism for cluster 301 wide dissemination of node 303 status information. It is to be understood that in due course the other nodes 303 of the cluster learn of the link 305 failure through the heartbeat mechanism. Thus, as a backup in the case where not all ACKs 407 are received within the amount of time it takes the nodes 303 to learn of the link 305 failure through the heartbeat mechanism, the nodes 303 of the cluster 301 can learn of the link-down event conventionally. It is to be understood that the implementation specifics of the protocol and format used for the broadcast of information concerning the link-down event, as well as the handshaking used to acknowledge receipt thereof, can vary between embodiments as desired (e.g., atomic broadcast, two phase commit, etc.).

In some embodiments, when the link failure detecting module 309 detects the failure of a link 305, the broadcasting module 401 waits for a grace period before transmitting the broadcast message 403. The purpose of the grace period is to avoid broadcasting a link-down event in the case where a link goes down but comes back up almost immediately (e.g., a flaky link). The length of the grace period is a variable design parameter, but is typically quite short relative to the time scale of the heartbeat mechanism. For example, grace periods of 0.5 seconds, 1 second, or two seconds could be used. In such embodiments, if the failed link 305 comes back up within the grace period, the broadcast message 403 is not sent. On the other hand, if the grace period passes and the link 305 is still down, then the broadcasting module 401 proceeds to transmit the message 403 to the other nodes 303.

FIG. 5 illustrates another embodiment, in which the link failure management system 101 disseminates a notification 501 of a link 305 failure to the other nodes 303 of the cluster 301 through a centralized computing device 503. In this embodiment, when the link failure detecting module 309 detects a link 305 failure, instead of (or in addition to) broadcasting a message 403 to the other nodes 303, a transmitting module 505 of the link failure management system 101 transmits a notification 501 to a centralized computing device 503 (e.g., a server 105, a disk 244, etc.). In this embodiment, a polling module 507 of the link failure management system 101 on each node 303 of the cluster 301 polls the centralized computing device 503 at a specific frequency for notifications 501 of link 305 failures, and learns of link 305 failures that way. The specific polling frequency to use is a variable design parameter. Instead of or in addition to the polling, the centralized computing device 503 can, upon receipt of a notification 501 concerning a link-down event, transmit the notification 501 to all of the nodes 303 of the cluster 301. These embodiments could be used, for example, when no cluster links 305 are available to the broadcasting module 401 on a given node 303 for transmitting a link-down event broadcast message 403.

Figure 6:
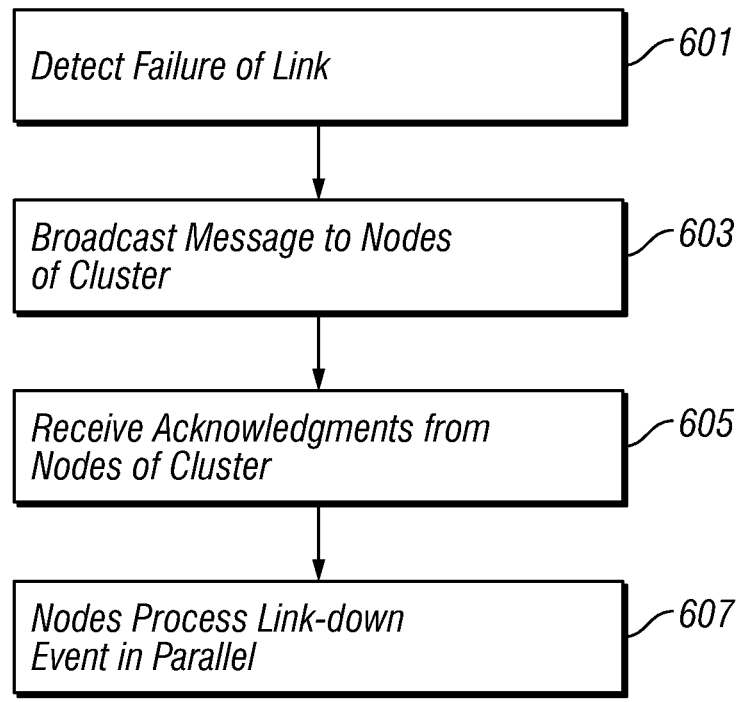
FIG. 6 is a flowchart of the operation of a link failure management system, according to one embodiment.

FIG. 6 illustrates steps of the operation of the link failure management system 101, according to one embodiment. The link failure detecting module 309 detects 601 the failure of a specific link 305 of a specific node 303 of the cluster 301. The broadcasting module 401 broadcasts 603 a message 403 notifying the nodes 303 of the cluster 301 of the detected link 305 failure, such that the nodes 303 receive the message 403 prior to learning of the link-down event from the expiration of corresponding heartbeats. The acknowledgement receiving module 405 receives 605 acknowledgements 407 confirming receipt of the broadcast message 403 from the nodes 303 in the cluster 301. Each of the nodes 303 of the cluster 301 processes 607 the link-down event in parallel.

Figure 7:
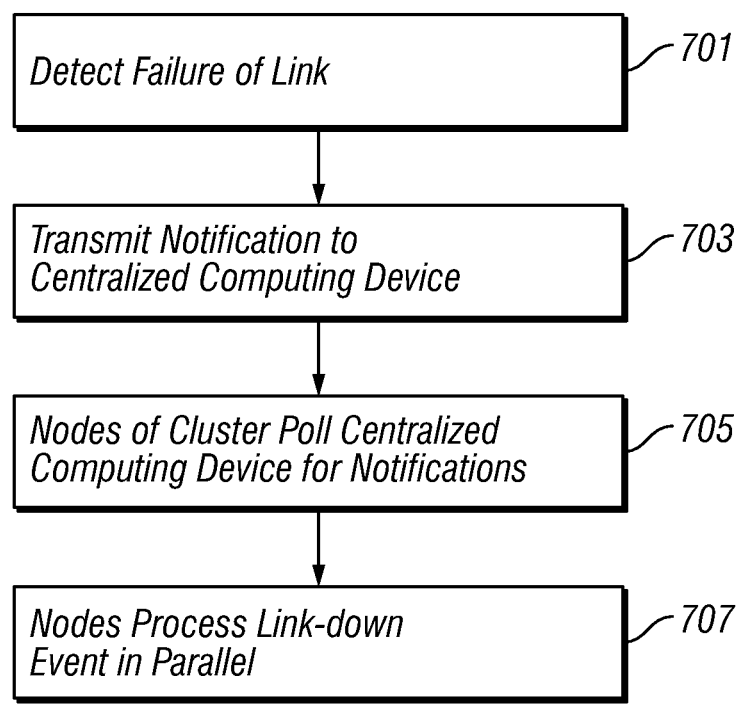
FIG. 7 is a flowchart of the operation of a link failure management system, according to another embodiment.

FIG. 7 illustrates steps of the operation of the link failure management system 101, according to another embodiment. The link failure detecting module 309 detects 701 the failure of a specific link 305 of a specific node 303 of the cluster 301. The transmitting module 505 transmits 703 a notification 501 concerning the link-down event to a centralized computing device 503. The polling modules 507 on the nodes 303 of the cluster 301 poll 705 the centralized computing device 503 at a specific frequency for notifications 501 of link 305 failures, such that the nodes 303 of the cluster 301 learn of the link-down event from polling prior to learning of it from the expiration of corresponding heartbeats. Each of the nodes 303 of the cluster 301 processes 707 the link-down event in parallel.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for propagating a detection of a failure of a link to each of a plurality of nodes of a cluster, the method comprising the steps of:

detecting a link-down event comprising a failure of a specific link of a specific node of the cluster; and disseminating a notification of the failure of the specific link to the plurality of nodes of the cluster, using a separate link communicatively coupled to each node of the cluster, the link being dedicated to broadcasting link-down event notification messages, such that the nodes process the link-down event in parallel;

wherein the disseminating of the notification of the failure of the specific link is executed such that the nodes of the cluster receive the notification prior to learning of the link-down event from expiration of corresponding heartbeats.

2. The method of claim 1 wherein disseminating a notification of the failure of the specific link to the plurality of nodes of the cluster further comprises:

broadcasting a message to the nodes of the cluster, the message notifying the nodes of the cluster of the failure of the specific link.

3. The method of claim 2 further comprising:

using the separate link to broadcast the message to the nodes of the cluster.

4. The method of claim 3 wherein maintaining a separate link communicatively coupled to each node of the cluster, the link being dedicated to broadcasting link-down event notification messages further comprises:

maintaining the separate link as a private link which is not exposed to users of the cluster.

5. The method of claim 2 further comprising:

ensuring that the broadcast message has been received by the nodes of the cluster before processing the link-down event.

6. The method of claim 5 wherein ensuring that the broadcast message has been received by the nodes of the cluster before processing the link-down event further comprises:

waiting to receive an acknowledgement confirming receipt of the broadcast message from each of the nodes of the cluster before processing the link-down event.

7. The method of claim 5 further comprising:

in response to not having received an acknowledgement confirming receipt of the broadcast message within a given period of time, retransmitting the broadcast message.

8. The method of claim 1 further comprising:

responsive to detecting a failure of the link, waiting for a specific grace period before disseminating the notification of the failure of the link.

9. The method of claim 1 wherein disseminating a notification of the failure of the specific link to the plurality of nodes of the cluster further comprises:

transmitting a notification of the failure of the specific link to a centralized computing device that is accessible to all of the nodes of the cluster.

10. The method of claim 9 wherein:

each node of the cluster polls the centralized computing device at a specific frequency for notifications of link failures, such that the nodes of the cluster learn of the failure of the specific link from polling the centralized computing device.

11. The method of claim 9 wherein:

the centralized computing device transmits the notification of the failure of the specific link to the nodes of the cluster.

12. The method of claim 1 wherein detecting a failure of the specific link of the specific node of the cluster further comprises:

receiving a notification of the failure of the specific link from an operating system of the specific node.

13. At least one non-transitory computer readable medium storing a computer program product for propagating a detection of a failure of a link to each of a plurality of nodes of a cluster, the computer program product comprising:

program code for detecting a link-down event comprising a failure of a specific link of a specific node of the cluster; and program code for disseminating a notification of the failure of the specific link to the plurality of nodes of the cluster using a separate link communicatively coupled to each node of the cluster, the link being dedicated to broadcasting link-down event notification messages, such that the nodes process the link-down event in parallel;

wherein the disseminating of the notification of the failure of the specific link is executed such that the nodes of the cluster receive the notification prior to learning of the link-down event from expiration of corresponding heartbeats.

14. The computer program product of claim 13 wherein the program code for disseminating a notification of the failure of the specific link to the plurality of nodes of the cluster further comprises:

program code for broadcasting a message to the nodes of the cluster, the message notifying the nodes of the cluster of the failure of the specific link.

15. The computer program product of claim 14 further comprising:

program code for ensuring that the broadcast message has been received by the nodes of the cluster before processing the link-down event.

16. The computer program product of claim 15 wherein the program code for ensuring that the broadcast message has been received by the nodes of the cluster before processing the link-down event further comprises:

program code for waiting to receive an acknowledgement confirming receipt of the broadcast message from each of the nodes of the cluster before processing the link-down event.

17. The computer program product of claim 15 further comprising:

program code for, in response to not having received an acknowledgement confirming receipt of the broadcast message within a given period of time, retransmitting the broadcast message.

18. The computer program product of claim 13 wherein the program code for disseminating a notification of the failure of the specific link to the plurality of nodes of the cluster further comprises:

program code for transmitting a notification of the failure of the specific link to a centralized computing device that is accessible to all of the nodes of the cluster.

19. The computer program product of claim 18 further comprising:

program code for each node of the cluster polling the centralized computing device at a specific frequency for notifications of link failures, such that the nodes of the cluster learn of the failure of the specific link from polling the centralized computing device.

20. A computer system for propagating a detection of a failure of a link to each of a plurality of nodes of a cluster, the computer system comprising:

a processor;

computer memory;

a link failure detecting module residing in the computer memory, for detecting a link-down event comprising a failure of a specific link of a specific node of the cluster; and a broadcasting module residing in the computer memory, for broadcasting a message notifying the nodes of the cluster of the detected link failure using a separate link communicatively coupled to each node of the cluster, the link being dedicated to broadcasting link-down event notification messages, such that the nodes of the cluster receive the notification prior to learning of the link-down event from expiration of corresponding heartbeats, and process the link-down event in parallel.

\* \* \* \* \*